United States Patent
Diederichs

(10) Patent No.: US 7,938,020 B2
(45) Date of Patent: May 10, 2011

(54) HIGH PRESSURE MAGNETIC FLOWMETER WITH STRESS RESISTANT ELECTRODE ASSEMBLY

(75) Inventor: Craig Allen Diederichs, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 77 days.

(21) Appl. No.: 12/462,092

(22) Filed: Jul. 29, 2009

(65) Prior Publication Data

US 2010/0024568 A1 Feb. 4, 2010

Related U.S. Application Data

(60) Provisional application No. 61/137,257, filed on Jul. 29, 2008.

(51) Int. Cl.
*G01F 1/58* (2006.01)
(52) U.S. Cl. .................................................. 73/861.12
(58) Field of Classification Search ............. 73/861.12, 73/861.11, 861.15
See application file for complete search history.

(56) References Cited

U.S. PATENT DOCUMENTS

| | | | |
|---|---|---|---|
| 3,813,938 A * | 6/1974 | Grosch et al. ............ 73/861.12 | |
| 4,279,166 A | 7/1981 | Gryn et al. | |
| 4,297,896 A | 11/1981 | May | |
| 4,297,897 A | 11/1981 | Young | |
| 5,247,837 A | 9/1993 | Corpron | |
| 5,469,746 A * | 11/1995 | Fukunaga et al. ......... 73/861.12 |
| 5,551,306 A | 9/1996 | Scarpa | |
| 6,598,487 B1 | 7/2003 | Marsch | |
| 6,611,770 B1 | 8/2003 | O'Donnell et al. | |
| 7,093,500 B2 * | 8/2006 | Schulz et al. ............. 73/861.15 |
| 2009/0178489 A1* | 7/2009 | Iijima ..................... 73/861.11 |

FOREIGN PATENT DOCUMENTS

| | | |
|---|---|---|
| JP | 611325 U | 1/1986 |
| JP | 8271302 A | 10/1996 |

OTHER PUBLICATIONS

International Search Report and Written Opinion for PCT/US2009/052129.

* cited by examiner

*Primary Examiner* — Jewel Thompson
(74) *Attorney, Agent, or Firm* — Kinney & Lange, P.A.

(57) ABSTRACT

An electrode assembly comprises a housing, an electrode, a retainer and a potting material. The housing has a first end and a second end, with the electrode extending from the first end of the housing to a process flow. The retainer is positioned about the electrode, inside the housing. The potting material fills voids between the first end of the housing and the second end of the housing, such that the potting material limits displacement of the electrode when the electrode head is subject to pressure from the process flow.

20 Claims, 3 Drawing Sheets

HIGH PRESSURE MAGNETIC FLOWMETER WITH STRESS RESISTANT ELECTRODE ASSEMBLY

CROSS-REFERENCE TO RELATED APPLICATION

This application claims priority from provisional U.S. patent application No. 61/137,257, entitled HIGH PRESSURE MAGNETIC FLOWMETER WITH STRESS RESISTANT ELECTRODE ASSEMBLY, filed Jul. 29, 2008 by Craig Allen Deiderichs.

BACKGROUND

This invention relates generally to fluid processing, and specifically to magnetic flowmeters for measuring process flow. In particular, the invention concerns an electrode assembly for magnetic flowmeters subject to high process pressure.

Flow sensors provide utility across a wide range of fluid processing applications, including agriculture, environmental control, water and air distribution, food and beverage preparation, bulk fluid storage and transport, chemical and pharmaceutical production, energy and hydrocarbon fuel production, and manufacturing processes utilizing thermoplastics, glues, resins and other fluidic materials. In each of these applications, the most appropriate flow measurement techniques depend not only upon the properties of the process fluid itself, but also upon the particular flow processes applied to it.

Standard flow measurement technologies include turbine flowmeters, which characterize flow as a function of mechanical rotation, and differential pressure-based devices, which characterize flow as a function of a pressure drop across an orifice plate or other differential pressure generating element, where the pressure drop is related to Bernoulli's principle and other velocity-dependent effects. Pilot tubes are also widely used, and based on similar principles. Additional technologies include mass flowmeters, which characterize flow as a function of thermal conductivity, vortex-shedding flowmeters, which characterize flow separation across a bluff body, and Coriolis flowmeters, which characterize flow as a function of momentum-dependent vibrational measurements.

Magnetic flowmeters distinguish from these technologies by measuring flow as a function of Faraday's Law, which depends upon electromagnetic rather than mechanical or thermodynamic effects. In particular, magnetic flowmeters measure flow as a function of the electromotive force induced when a magnetic field is generated across a conducting process fluid flow.

Magnetic flowmeters thus provide advantages in "dirty" and abrasive or corrosive flows, which are often unsuitable for mechanical turbines and traditional sensor probe configurations, and when differential pressure-based devices produce an unacceptable pressure drop. Because magnetic flow measurements depend upon electromagnetic induction, however, the technology also poses a number of design challenges. In particular, the flow must be conductive for the Faraday effect to occur, and the electrode assembly must be carefully insulated and sealed in order to prevent shorts and leaks. This is particularly true when the flowmeter is subject to high process pressures, for example in hydraulic fracturing and related methods of hydrocarbon fuel extraction and processing.

SUMMARY

This invention concerns an electrode assembly for sensing an electromotive force induced across a process flow, and a flowmeter based on the assembly. The assembly comprises a housing, an electrode and a retainer. The housing has a first end and a second end. The electrode extends from the first end of the housing to the process flow, in order to sense the electromotive force. The retainer is positioned about the electrode, inside the housing. A potting material is disposed within voids in the housing, in order to limit displacement of the electrode when subject to process pressure from the process flow.

DETAILED DESCRIPTION

Figure 1:
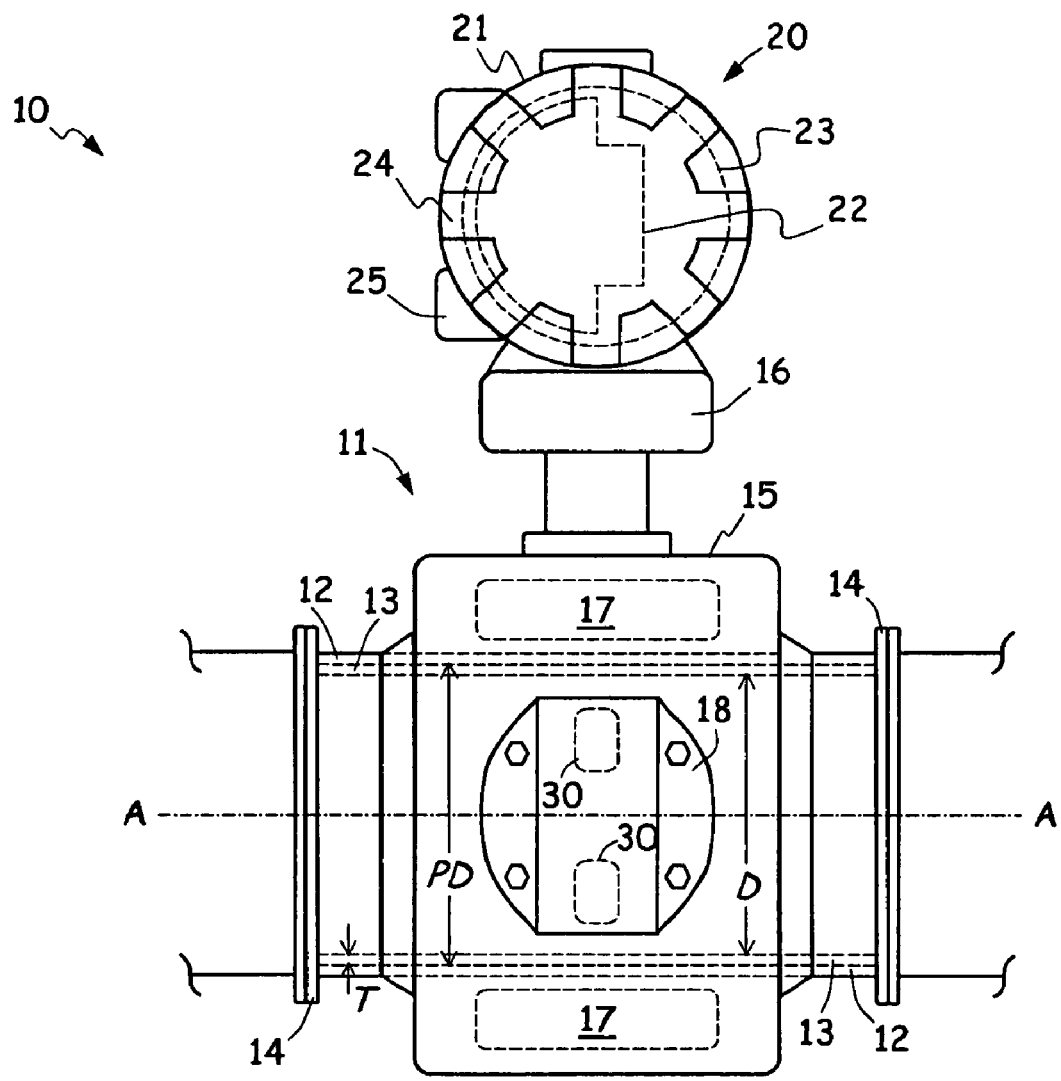
FIG. 1 is a schematic side view of a magnetic flowmeter with integrated transmitter.

FIG. 1 is a schematic side view of magnetic flowmeter 10 with flowmeter body 11, including integrated transmitter 20 and high-pressure, stress-resistant electrode assemblies 30. Flowmeter body 11 comprises pipe section 12 with liner 13 and process coupling 14, housing 15 with transmitter mount 16, coils 17 and (depending on embodiment) electrode access port 18, a nameplate, or both. Pipe section 12 and liner 13 are shown in cross-sectional representation, using dashed or hidden lines. Coils 17 and electrode assemblies 30 are internal to flowmeter body 11 and shown in schematic form, also with dashed lines.

Transmitter 20 is mounted to flowmeter body 11 at mount 16. Transmitter 20 comprises transmitter housing 21, terminal block 22, electronics/local operator interface (LOI) assembly 23, terminal cover 24 and conduit connection(s) 25. Terminal block 22 and LOI assembly 23 are internal to transmitter housing 21, and shown in schematic form using dashed lines.

Depending on embodiment, magnetic flowmeter 10 encompasses either flowmeter body 11, as distinct from transmitter 20, or the combination of flowmeter body 11 with integrated transmitter 20. As shown in FIG. 1, for example, flowmeter 10 includes both flowmeter body 11 and transmitter 20, which is directly mounted to flowmeter body 11 via transmitter mount 16. In this embodiment, mount 16 provides an internal path for electrical connections between transmitter 20 and flowmeter body 11. In alternate embodiments, transmitter 20 is remotely mounted, and the connections are external.

Pipe section 12 provides a process flow channel through flowmeter body 1. Typically, pipe section 12 comprises a length of pipe or conduit with a circular cross section, for example with inner (inside) diameter PD of approximately eight inches (8", or about 20 cm). Alternatively, PD ranges between about one half inch and about twelve inches (about ½"-12", or about 1.27-30 cm). In further embodiments, pipe section 12 is formed with an oval, rectangular or other non-circular cross-section.

Pipe section 12 is typically manufactured of a durable, machinable, corrosion-resistant and nonmagnetic metal such as stainless steel, aluminum, copper or brass, or a combination of such materials. In other embodiments, pipe section 12 is formed of a durable polymer such as PVC (polyvinyl chloride) or ABS (acrylonitrile butadiene styrene) plastic, or another durable thermoplastic or polymer material.

Liner 13 lines pipe section 12 along diameter PD, forming an electrical, chemical, and mechanical barrier between pipe section 12 and the process flow. Liner 13 also insulates pipe section 12 from electrical contact with the process flow, and protects from erosion and corrosion due to chemical or abrasive agents in the process fluid.

Liner 13 is typically comprised of polyurethane or another nonmagnetic insulating polymer material, but the composition varies depending upon flow conditions. In some embodiments, for example, protective liner 13 is comprised of a PFA (Perfluoroalkoxy) material such as Teflon®, Teflon®-PFA or Tefzel®-PFA, a PPS (Polyphenylene sulfide) material such as Ryton® PPS, or another polymer material such as Neoprene or natural rubber, in order to provide chemical, electrical and abrasive protection against a range of different process fluids. These and other suitable materials for liner 13 are available from a variety of commercial vendors, including DuPont and Company of Wilmington, Del., Chevron Phillips Chemical of The Woodlands, Tex., and Rosemount Inc. of Chanhassen Minn., an Emerson Process Management company.

Protective/insulating liner 13 has thickness T, such that the flow channel through flowmeter body 11 has diameter D=PD−2T. Thickness T generally scales with pipe diameter PD, although the relationship is not strictly linear. For an eight-inch (20 cm) pipe, for example, insulating liner 13 typically has thickness T of about 0.308 inches (0.308", or about 4.8 mm). In other embodiments, T varies from about a tenth of an inch or less (T≦0.10", or about 2.5 mm), to about one quarter inch or more (T≧0.25", or about 6.4 mm). This corresponds generally to pipe diameters PD of about one half inch to about one foot (½"-12", or about 1.27-30 cm). In alternate embodiments, pipe section 12 and liner 13 are formed together, utilizing a durable, insulating and non-magnetic material such as PVC plastic or ABS plastic.

Process couplings 14 are formed onto one or both ends of pipe section 12, in order to form fluid couplings to a process flow system. Couplings 14 are typically comprised of the same material(s) as pipe section 12, and are formed onto pipe section 12 via a combination of machining, drilling, cutting, welding, and other fabrication techniques. The particular structure of process coupling 14 thus varies from embodiment to embodiment, in order to accommodate a wide range of different process flow connections. These include, but are not limited to, through-hole bolt-mounted coupling flanges (as shown in FIG. 1), external ring and collar mounts, threaded pipe fittings, compression fittings, and a variety of different surfaces designed for joining by metal or chemical welding.

Flowmeter housing 15 is formed from a combination of strong, durable, machinable materials, including steel, stainless steel, brass, aluminum, copper and a variety of durable plastic polymers. These materials are shaped into a number of side walls, end walls, cover plates and other structures, forming a generally annular insulating and protective enclosure about pipe section 12, coils 17, electrode assemblies 30 and the other internal components of flowmeter body 11. Typically, housing 15 also forms a pressure seal against the outside of pipe section 12, in order to prevent the inflow of conducting or corrosive fluids, explosive gases and other hazardous environmental agents.

Coils 17 comprise a number of copper or other conducting wire windings. Coils 17 are positioned proximate an outer radius of pipe section 12, in order to generate magnetic flux across the process flow channel when provided with an energizing current. Coils 17 thus function as a field source for generating a magnetic field across the process flow, with the field oriented in a substantially perpendicular sense across liner 13 and pipe section 12.

In some embodiments, coils 17 comprise a soft iron core to increase the magnetic flux, or to shape the field lines. In further embodiments, flowmeter body 11 comprises additional magnetically soft flux return components to improve field strength and uniformity, and to reduce fringing fields outside housing 15.

Flowmeter 10 typically comprises two opposing electrode assemblies 30, one on each side of pipe section 12. Assemblies 30 are sometimes "clocked" about axis A of pipe section 12 (see, e.g., FIG. 2, as described below), such that they do not lie in a plane with pipe section 12.

In the embodiment of FIG. 1, each electrode assembly 30 is covered by electrode access port 18, which forms a mechanical and pressure seal against flowmeter body 11. In some embodiments, ports 18 are welded or otherwise permanently attached after electrode assemblies 30 are installed, and in other embodiments ports 18 are removable to provide maintenance access.

As described in more detail below, electrode assemblies 30 employ a stress-resistant design configured for use in high-pressure applications with process pressures ranging from about 3,000 psi (20.7 MPa) up to 6,000 psi (41.4 MPa) and above, such that flowmeter 10 achieves an ANSI (American National Standards Institute) pressure rating of 1500# or 2500#. In some embodiments, electrode assemblies 30 are also suitable for use in a flowmeter capable of operating at process pressures of 10,000 psi (68.9 MPa) and above, for specialized process flow applications. Note that absolute pressures (in psi) and gage pressures (in psig) differ by less than one half of one percent in this range, so they are sometimes used interchangeably.

Transmitter housing 21 is manufactured of a durable material such as metal or a durable plastic, or a combination of such materials, forming a protective enclosure about terminal block 22, electronics/LOI assembly 23 and the other internal components of transmitter 20. The enclosure provides electrical and thermal insulation, shields from adverse environmental conditions including moisture and corrosive or explosive agents, and protects from accidental contact with process machinery, tools, falling objects and other potential hazards. Transmitter housing 21 also provides internal mounting structures, in order to secure the internal components of transmitter 20 in place.

Terminal block 22 is formed of a durable plastic or other insulating material, and provided with a number of electrically conducting terminals. The terminal connections provide power to transmitter 20, and allow input/output (I/O) and process control access via a loop wire, a control bus, a data bus, data cables or similar means of process system communications.

Terminal block cover 24 forms a pressure seal with transmitter housing 21, and provides access to the connections on terminal block 22. Conduit connection(s) 25 provide conduit entries for additional external connections or circuits.

Electronics/LOI assembly 23 includes a local operator interface (LOI) and a number of different circuit elements including, but not limited to, a controller for controlling magnetic flowmeter 10 and transmitter 20, a current or voltage source for energizing coils 17, a signal processor for processing voltage signals from electrode assemblies 30, and a remote user interface for communicating between transmitter 20 and a process control system.

In typical embodiments, electronics/LOI assembly 23 comprises distinct LOI and current source components, as well as a microprocessor/controller (see FIG. 2, below). The LOI provides for user input of flowmeter setup and calibration information, and an electronics cover on the back of transmitter 20 (not shown in FIG. 1) provides operator access to the LOI, typically via an interactive display.

While flowmeter 10 is shown with transmitter 20 directly mounted to flowmeter body 11, FIG. 1 is also representative of a wide range of alternate embodiments. In remote-mount configurations, for example, transmitter 20 is locatable up to 1,000 feet (about 300 m) from flowmeter body 11, with electrical and data connections provided via cables, wires or a power, data and control bus, or similar means of remote communication.

The other flowmeter and transmitter components also vary somewhat in form and detail. As shown in FIG. 1, for example, flowmeter 10 represents a particular 8700-series magnetic flowmeter, as available from Rosemount Inc. In alternate embodiments, flowmeter 10 represents any of a wide range of commercially available or customized magnetic flowmeter designs, as available from Rosemount and other commercial vendors.

In operation of flowmeter 10, transmitter 20 provides an energizing current to coils 17. Coils 17 generate a magnetic field across the process flow in pipe section 12, and electrode assemblies 30 sense the electromotive force (EMF) induced across the process flow by the magnetic field. Transmitter 20 generates a process output representing the flow rate as a function of the induced EMF, which is sampled via electrical connections between electrode assemblies 30 and electronics/LOI assembly 23.

When subject to high process pressures, transmitter assemblies 30 are susceptible to displacement and deformation, which can adversely affect the performance of flowmeter 10. In order to reduce these effects, a potting material is used to fill voids inside assemblies 30, limiting internal motion and increasing pressure resistance as described below.

Figure 2:
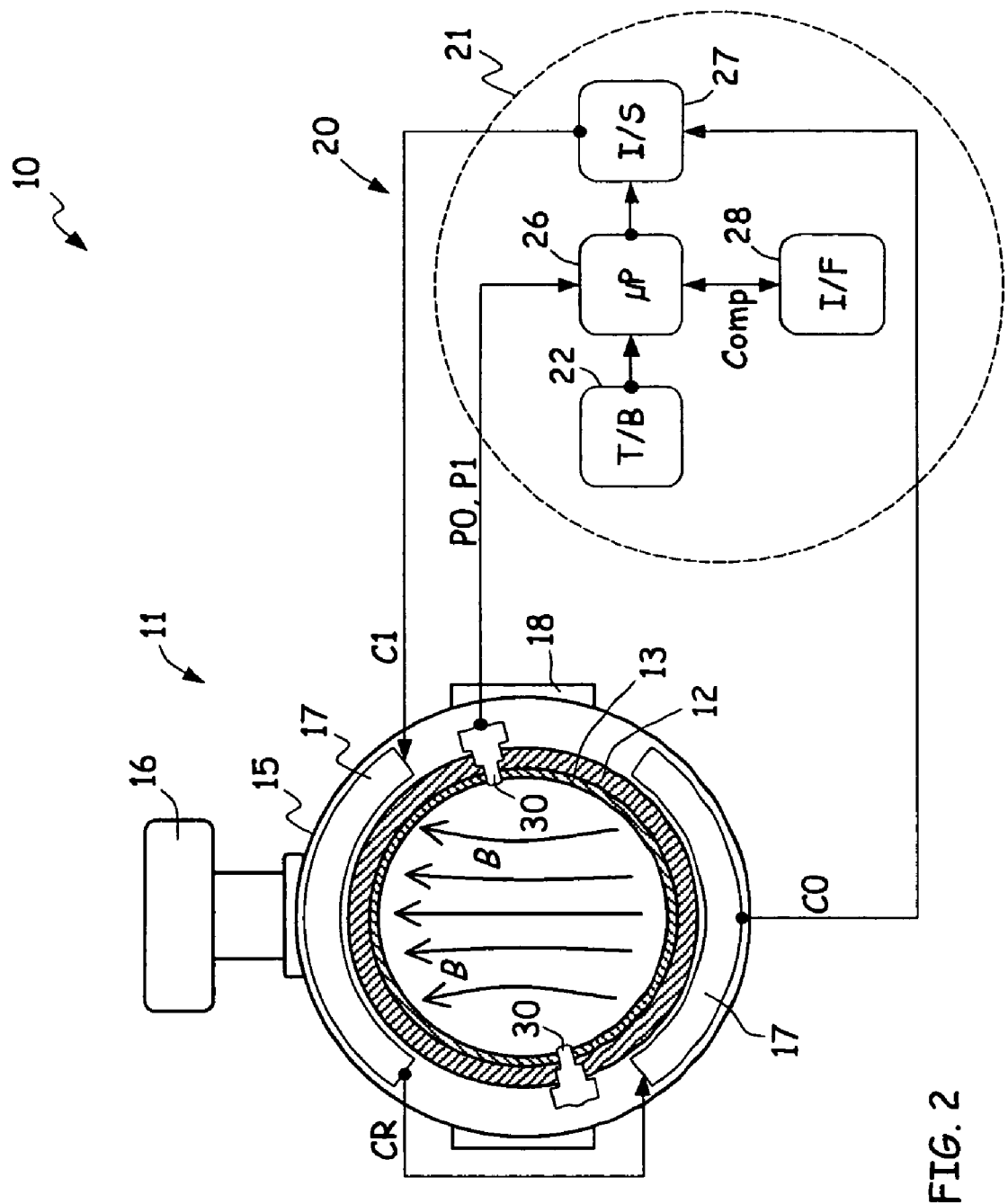
FIG. 2 is a schematic end view of the magnetic flowmeter in FIG. 1, illustrating the functional relationships between particular components of the transmitter.

FIG. 2 is a schematic end view of magnetic flowmeter 10, including particular components of transmitter 20. Flowmeter 10 comprises flowmeter body 11 with pipe section 12, each shown with diagonal cross-hatching. The components of transmitter 20 are shown in schematic rather than physical form, in order to illustrate their functional relationships with the various elements of flowmeter body 11.

Flowmeter body 11 comprises pipe section 12 with liner 13, housing 15, transmitter mount 16, coils 17 and electrode assemblies 30. Flowmeter housing 15 forms an annular enclosure about pipe section 12, liner 13, coils 17 and electrode assemblies 30, as described above. In this particular embodiment, cover ports 18 are provided for each electrode assembly 30.

Protective liner 13 lines pipe section 12 along the inner pipe diameter, forming an insulated process flow channel through flowmeter body 11. The process flow is directed out of the page in FIG. 2, through magnetic field B as generated by coils 17. The process couplings on the end of pipe section 12 are not shown in this view.

Transmitter 20 comprises transmitter housing 21, which encloses terminal block (T/B) 22 and the electronics/LOI assembly, including microprocessor/controller (μP) 26, current source (I/S) 27 and user interface (I/F) 28. Terminal block 22 provides power to microprocessor/controller 26 and the other components of transmitter 20, using connections to an external power supply (not shown).

In some embodiments, external connections are made via a single loop wire, which also provides process control communications via a superimposed digital or analog signal. In other embodiments, communications with transmitter 20 take place over any combination of standard analog wire loops, control buses and data cables, or via infrared, optical, RF (radio-frequency) and other wireless devices.

Transmitters configured for these and other means of communication are available from Rosemount Inc. and other commercial vendors. In these embodiments, transmitter 20 also utilizes a variety of different process communication protocols including, but not limited to, standard analog (4-20 mA) protocols, hybrid analog-digital protocols such as HART®, and digital measurement and control protocols such as Foundation™ Fieldbus and PROFI®BUS/PROFI®NET.

Microprocessor/controller 26 is connected to electrode assemblies 30, with electrical communication via probe wires P0, P1 (for clarity, only one connection is shown in FIG. 2). Microprocessor/controller 26 comprises a signal processor for calculating the flow rate as a function of the electrode signal (that is, as a function of the induced EMF or Faraday voltage), and a current controller for controlling current source 27.

Current source 27 comprises a current-limited or voltage-limited power source, which energizes coils 17 via coil drive wires C0 and C1. In typical embodiments, coils 17 are "daisy chained" or connected in series via coil return CR, such that each coil 17 carries the same current, and contributes approximately equally to the overall field strength. In other embodiments, current source 27 provides individually controlled energizing currents for a number of different coils 17.

When current source 27 energizes flowmeter 10, coils 17 generate relatively uniform magnetic field B inside pipe section 12, across the process flow conduit within inner protective liner 13. Over a wide operating range, the field strength (or magnetic flux density) is approximately proportional to the energizing current. As shown in FIG. 2, magnetic field B is also typically oriented in a substantially perpendicular sense with respect to pipe section 12 and liner 13, so the process flow intersects the field at an approximately normal (90°) angle of incidence.

Electrode assemblies 30 extend through pipe section 12 and liner 13 to form direct electrical contact with the process flow. As shown in FIG. 2, electrode assemblies 30 are diametrically opposed across pipe section 12, and "clocked" by an angle of about thirty to sixty degrees (30-60°) from the horizontal. Alternatively, electrode assemblies 30 are clocked by about forty-five degrees (45°), or are horizontally or vertically aligned, and installed with or without ports 18.

When a conducting process fluid flows through magnetic field B, a Faraday loop forms across electrode assemblies 30. This allows magnetic flowmeter 10 to generate an induced EMF signal or Faraday voltage, which is a function of the process flow rate and the magnetic field strength. Electrode assemblies 30 sense the EMF, and transmit it to the signal processor (microprocessor/controller 26) via electrode sense lines P0 and P1.

The induced EMF signal is substantially proportional to the flow velocity of the process fluid, which in turn is proportional to the volume flow rate. More specifically, the induced EMF (E) is proportional to the average flow velocity (V), average magnetic field strength B, and diameter D of the flow channel. That is, $$E = kBDV, \quad [1]$$

where k (the "k-factor") is a proportionality constant that depends upon the units in which E, B, D and V are measured. Inverting Eq. 1, the process flow velocity is given as a function of the induced potential, the magnetic field strength, and diameter D:

$$V = \frac{E}{kBD}. \qquad [2]$$

The flow velocity is thus directly proportional to the induced EMF, and indirectly proportional to the magnetic field strength and diameter of the flow channel. The volumetric flow rate, in turn, is proportional to the flow velocity (that is, flow velocity V times the flow area).

In some embodiments, transmitter 20 is configured for pulsed DC (direct-current) magnetic flow measurement. In these embodiments, microprocessor/controller 26 varies or modulates current source 27 in order to reduce signal noise. Pulsed-DC measurements lessen the effects of electrolytic reactions between the process fluid and electrode assemblies 30, as well as capacitive couplings between coils 17 and external electrical systems, stray voltage and current loops, phase shifts due to process flow impedance, and quadrature voltage effects including inductive couplings between the magnetic field, the process fluid and the probe signal lines.

Figure 3:
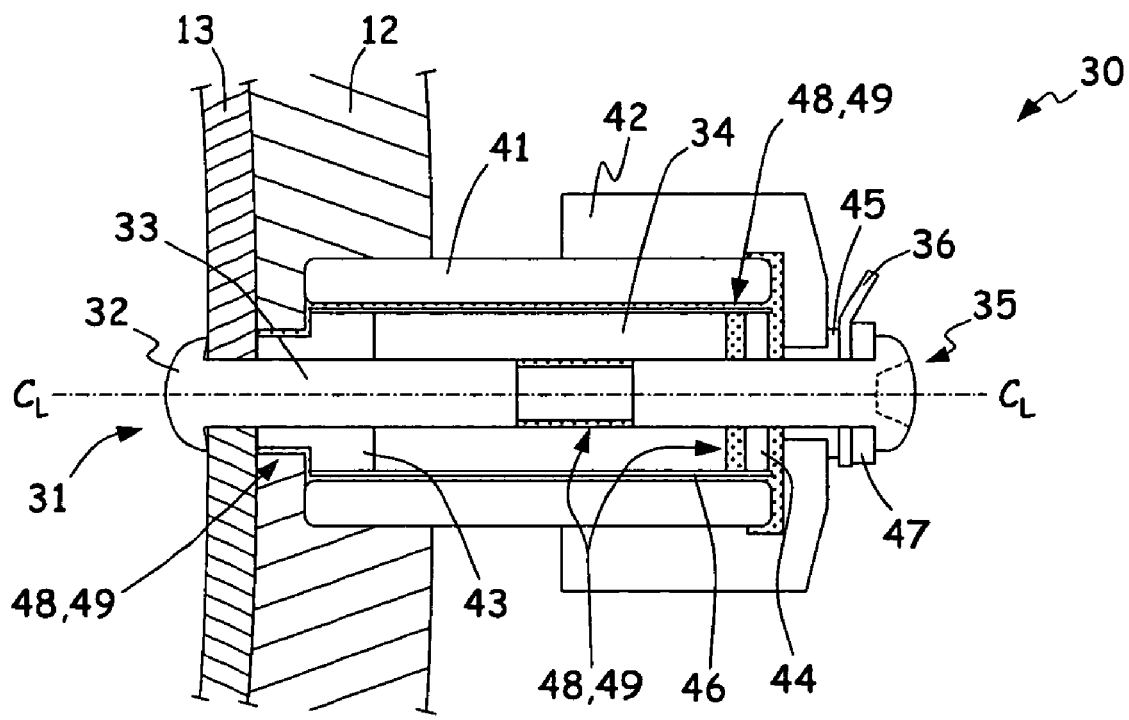
FIG. 3 is a cross-sectional view of a stress-resistant electrode assembly for the magnetic flowmeter in FIG. 1.

FIG. 3 is a cross-sectional schematic showing a representative embodiment of electrode assembly 30 for magnetic flowmeter 10. In this particular embodiment, electrode assembly 30 comprises electrode 31 with head 32 and body 33, electrode retainer 34, external contact screw 35, terminal connector 36 and electrode housing (or holder) 41 with cap (or cap nut) 42, insulating spacers 43, 44 and 45, insulating layer 46 and external nut 47. Potting material 48 fills voids 49 within electrode housing 41. In particular, potting material 48 fills voids 49 between various the components of assembly 30, including electrode 31, retainer 34, contact screw 35, insulators/spacers 43, 44 and 45, housing 41 and cap 42.

Probe electrode 31 comprises an electrical sensor or conductor manufactured from a corrosion-resistant and erosion-resistant material with low resistivity. This material varies, depending upon the properties of the process flow and desired service life. In some embodiments, for example, electrodes 31 are manufactured from a stainless steel such as 266 SST, or from tantalum, platinum, titanium, Hastelloy® or another specialty alloy. Electrodes of these types are available from Rosemount Inc. and other commercial vendors, including Haynes International of Kokomo, Ind.

Electrode head 32 is located in contact with the process flow inside liner 13, and positioned to sense the EMF induced when a magnetic field is generated across pipe section 12. Electrode body 33 extends radially from electrode head 32 through liner 13 and pipe section 12, and into the radially inner end (the first end) of housing 41.

Electrode retainer 34 is coaxially oriented about the radially outer end of electrode body 33 and the radially inner end of contact screw 35, in order to mechanically retain electrode 31 within housing 41. In typical embodiments, retainer 34 is formed of a conducting material in order to form an electrical connection between electrode 31 and contact screw 35, or another external contact for electrode 31. This allows electrode assembly 30 to transmit the EMF sensed by electrode 31 to a microprocessor or other processing device, for example via a ring terminal or other terminal connector 36. Alternatively, retainer 34 is formed of an insulating material and the electrical connection is formed by other means, for example a conducting element positioned between electrode body 33 and contact screw 35 along radial centerline $C_L$.

Electrode housing 41 is coaxially oriented about the radially outer portion of electrode body 33, with a portion of liner 13 located between electrode head 32 and the first (radially inner) end of housing 41. In some embodiments, housing 41 is partially recessed or embedded within pipe section 12, as shown in FIG. 3, and extends radially from pipe section 12 along radial centerline $C_L$ of assembly 30.

In this particular embodiment, a portion of pipe section 12 is also located between electrode head 32 and the first end of housing 41. In other embodiments, electrode housing 41 is completely recessed, such that the first end of housing 41 extends through pipe section 12 to contact liner 13. In further embodiments housing 41 is not recessed, and extends from a radially outer margin of pipe section 12.

Cap 42 is disposed on the radially outer or second end of housing 41, opposite electrode 31, and works together with retainer 34 to hold electrode head 32, body 33 and contact screw 35 in position with respect to electrode assembly 30. In one embodiment, for example, cap 42 comprises a high pressure nut that is threaded onto the exterior of housing 41 to retain electrode head 32, body 33 and contact screw 35. In other embodiments, cap 42 comprises a screw or other form of threaded fastener that is screwed onto or into housing 41. In further embodiments, cap 42 comprises a clip, collar, bushing or other retention device fastened to housing 41 via threads, welding, brazing or another process, or cap 42 is integrally formed with housing 41.

Internal spacers 43 and 44 comprise electrically insulating and spacing members located between housing 41 and electrode body 33, and between housing 41, cap 42 and contact screw 35. External spacer 45 comprises an electrically insulating and spacing member located between cap 42 and contact screw 35, and between cap 42 and terminal 36.

Insulating layer 46 comprises shrink tubing or another form of electrical insulation between housing 41 and retainer 34. In some embodiments, insulating layer 46 also extends between housing 41 and spacer 43 or 44, or both. In further embodiments, additional spacing, retention or insulating elements such as external nut 47 are utilized to hold electrode 31, electrode retainer 34 or contact screw 35 in place with respect to spacers 43, 44, 45 and the other elements of electrode assembly 30. Note, however, that external nut 47 is not directly coupled to housing 41, but is spaced from housing 41 by other elements such as terminal connector 36, external spacer 45 and cap 42.

Insulators/spacers 43, 44 and 45 are formed of rigid and deformation-resistance insulating materials such as rigid polymers. In one embodiment, insulators 43 are formed of Ryton® or another polyphenylene sulfide (PPS) material, as available from Chevron Phillips Chemical.

In addition to their insulating function, spacers 43, 44 and 45 operate with cap 42 and retainer 34 to hold electrode 31 and contact screw 35 in position with respect to assembly 30 and housing 41. In particular, spacers 43 and 44 retain electrode 31 in position when head 32 is subject to process fluid pressure from the flow within pipe section 12 and liner 13.

As shown in FIG. 3, insulators/spacers 43, 44 and 45 are formed as collars, bushings, sleeves, washers or other generally annular structures, without or without threads, and are coaxially oriented about electrode 31 and contact screw 35. In other embodiments, spacers 43, 44 and 45 comprise any spacing or insulating elements utilized to insulate electrode 31 or to space head 32, body 33 and contact screw 35 from housing 41, cap 42 or other components of electrode assembly 30.

When electrode 31 is subject to process fluid pressure, the resulting forces tend to displace electrode head 32 and electrode body 33 radially with respect to housing 41, along radial centerline $C_L$. This displacement causes internal components such as spacers 43 and 44 to be compressed against cap 42 and housing 41, resulting in compressive stress and strain deformation.

To limit these effects, probe assembly 30 is constructed with a close-packed and rigid design in which individual components are closely spaced within housing 41. In certain locations, however, variable spaces or other gaps are unavoidable, for example to accommodate manufacturing tolerances or differences in the dimensions of particular parts, for example the length of probe electrode 31 with respect to the thickness of pipe section 12 and inner liner 13. In particular, such air gaps or voids 49 are sometimes located within housing 41 between electrode 31 and cap 42, as shown in FIG. 3.

While air gaps and voids 49 are small, they nonetheless increase the range of motion for electrode 31. This increases compressive stresses within housing 41 and results in strain deformation of assembly components such as insulators/spacers 43 and 44. The compressive stress and strain deformations tend to increase at high process pressures, for example pressures in excess of about 3,000 psi (about 20.7 MPa). Under some conditions, this can lead to fractures, cracks, leakage and other failure modes for probe assembly 30.

To address this problem, potting material 48 is provided within housing 41 of electrode assembly 30, and in particular potting material 48 is disposed within voids 49 between probe electrode 31 and cap 42. After filling voids 49, potting material 48 forms a hard material that is resistant to deformation and strain, even when subject to high compressive stress. This provides cap 42 with additional support for holding electrode 31 in position within housing 41. Potting material 48 also transfers compressive forces from electrode 31 with head 32 to one or more of retainer 34, housing 41 and cap 42, reducing stress and strain on more sensitive components such as insulator/spacers 43 and 44. Potting material 48 also fills available voids 49 inside housing 41 and probe assembly 30, reducing cold flow, plastic expansion and stress-induced deformation of the internal components.

Potting material 48 comprises a hard potting agent, which distinguishes from relatively flexible potting compounds such as RTV (room temperature vulcanization) and other silicone rubber-based compounds, and from other rubber or soft polymer-based products that are not substantially resistant to plastic or elastic deformation at high process pressures. In one embodiment, potting material 48 comprises a fluid or plastic epoxy mixed with a hardening agent to form a rigid material after filling voids 49, for example a polyepoxide or other thermosetting epoxide polymer mixed with a curing or catalyzing agent. Alternatively, potting material 48 comprises another hard potting agent that undergoes a transformation from a fluid or plastic form to a rigid and stress-resistant form after being disposed within voids 49, such as a hard-setting polymer resin or thermoplastic.

Typically, housing 41 is filled with potting material 48 first, before inserting electrode 31 and other internal components such as retainer 34, contact screw 35, and insulators/spacers 43 and 44. In contrast to previous designs, in which it was impossible to fully reduce gaps and voids, this allows potting material 48 to completely fill each air gap without leaving empty void areas. Alternatively, potting material 48 is applied to individual parts before being inserted into housing 41, or individual gaps and voids 49 are filled with potting material 48 as each individual component of probe assembly 30 is inserted into housing 41.

Potting material 48 thus limits or reduces displacement of electrode 31 with respect to housing 41, reduces compressive stress and strain within electrode assembly 30, and reduces pressure-induced deformations and failures of individual assembly components. In particular, potting material 48 is resistant to stress-induced deformation at process pressures exceeding 3,000 psi (20.7 MPa) and extending to at least 3,170 psi (21.85 MPa), such that electrode assembly 30 is suitable for use with a 1500# rated magnetic flowmeter, based on the ANSI scale, and suitable for use with process fluids comprising water or hydrocarbon fuels, or both, and with abrasive or corrosive agents such as sand and acids or alkali chemicals.

In additional embodiments, potting material 48 is resistant to stress-induced deformation at process pressures exceeding 6,000 psi (41.4 MPa) and extending to at least 6,107 psi (4.21 MPa), such that electrode assembly 30 is suitable for use with a 2500# rated magnetic flowmeter. In further embodiments, potting material 48 is resistant to stress-induced deformation at process pressures exceeding 10,000 psi (68.9 MPa), such that electrode assembly 30 is suitable for special-purpose applications including enhanced hydrocarbon extraction and hydraulic fracturing.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. An electrode assembly comprising:
   a housing having a first end and a second end;
   an electrode extending from the first end of the housing to a process flow;
   a retainer positioned about the electrode, inside the housing; and
   a potting material for filling voids between the first end of the housing and the second end of the housing, such that the potting material limits displacement of the electrode when the electrode is subject to pressure from the process flow.

2. The assembly of claim 1, further comprising a cap on the second end of the housing for holding the electrode and the retainer in place with respect to the housing.

3. The assembly of claim 2, wherein the potting material is sufficiently resistant to stress-induced deformation to limit displacement of the electrode when subject to process pressures exceeding 3,000 psi (20.7 MPa).

4. The assembly of claim 2, wherein the potting material is sufficiently resistant to stress-induced deformation to limit displacement of the electrode when subject to process pressures exceeding 6,000 psi (41.4 MPa).

5. The assembly of claim 1, wherein the retainer is formed of a conducting material, such that the retainer makes an electrical connection between the electrode and an external contact on the second end of the housing.

6. The assembly of claim 5, further comprising an insulator positioned about the retainer, between the retainer and the housing.

7. The assembly of claim 1, further comprising a liner disposed about the process flow and a pipe section disposed about the liner, such that the electrode extends from the first end of the housing through the liner and the pipe section to the process flow.

8. The assembly of claim 7, further comprising a coil for inducing an electromotive force in the electrode by generating a magnetic field across the process flow.

9. The assembly of claim 8, further comprising a processor for generating a process flow output as a function of the electromotive force.

10. The assembly of claim 9, further comprising a transmitter housing for the processor, wherein the transmitter housing is mounted to the pipe section.

11. A flowmeter comprising:
a pipe section;
a field source for generating a magnetic field across the pipe section; and
an electrode assembly for sensing an electromotive force induced by process flow through the magnetic field, the electrode assembly comprising:
an electrode extending through the pipe section to the process flow;
a housing coaxially disposed about the electrode, outside the pipe section;
a retainer coaxially disposed about the electrode, inside the housing;
a cap for holding the retainer and the electrode in place with respect to the housing; and
a potting agent for filling voids inside the housing.

12. The flowmeter of claim 11, wherein the potting agent limits compressive stress within the electrode assembly such that the flowmeter functions at process pressures in excess of 6,000 psi (41.4 MPa).

13. The flowmeter of claim 11, wherein the potting agent limits compressive stress within the electrode assembly such that the flowmeter functions at process pressures in excess of 10,000 psi (68.9 MPa).

14. The flowmeter of claim 11, further comprising an external contact located on the housing, and wherein the retainer forms an electrical connection between the electrode and the external contact.

15. The flowmeter of claim 14, further comprising an insulator coaxially disposed about the retainer, between the retainer and the housing.

16. The flowmeter of claim 15, further comprising a transmitter for transmitting a process output representing the process flow as a function of the electromotive force.

17. A magnetic flowmeter comprising:
a pipe section for process flow;
a liner coaxially disposed between the pipe section and the process flow;
a coil for inducing an electromotive force across the process flow; and
an electrode assembly for sensing the electromotive force, the electrode assembly comprising:
a housing;
an electrode coaxially disposed within the housing and extending from a first end of the housing through the pipe section and the liner to the process flow;
a retainer disposed between the electrode and the housing; and
a potting material disposed within voids between the electrode, the retainer and the housing.

18. The magnetic flowmeter of claim 17, wherein the potting material is disposed within the voids such that the electrode assembly has sufficient stress resistance for the flowmeter to achieve an ANSI 2500# pressure rating.

19. The magnetic flowmeter of claim 17, further comprising an insulator disposed between the retainer and the housing and a cap disposed on a second end of the housing, such that the cap holds the electrode, the retainer and the insulator in place with respect to the housing.

20. The magnetic flowmeter of claim 17, further comprising a processor for generating a flow output as a function of the electromotive force.

* * * * *